Oct. 9, 1928.
O. M. WOLFF
1,687,415
MEAT COOKER
Filed July 25, 1927
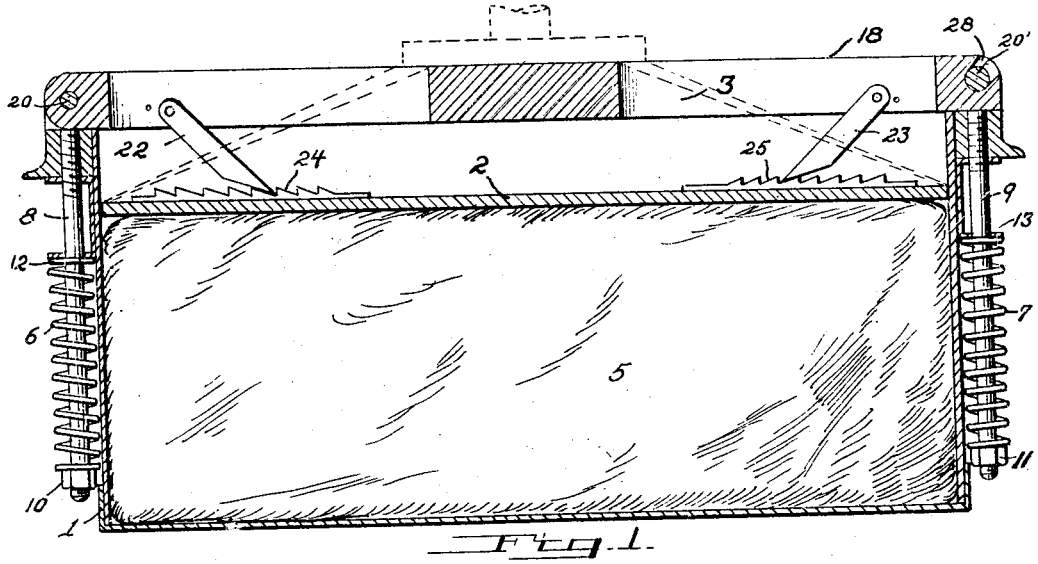
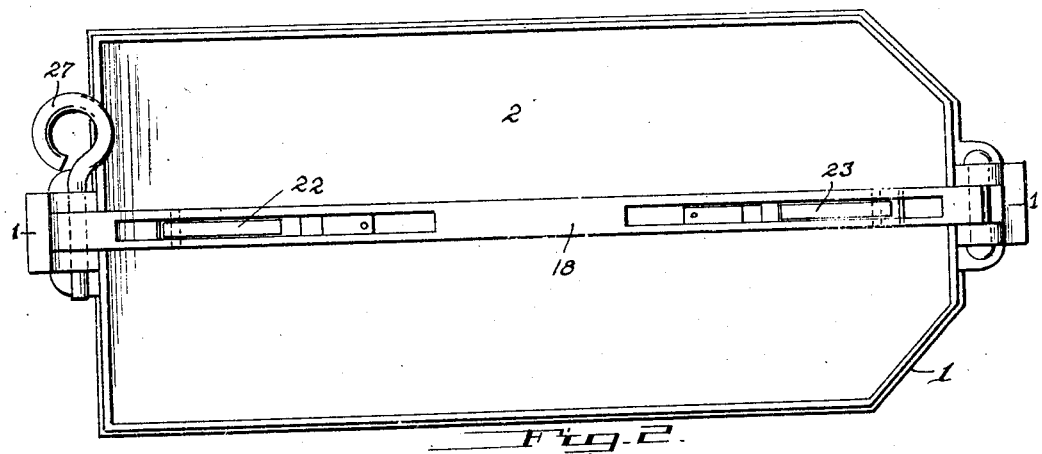
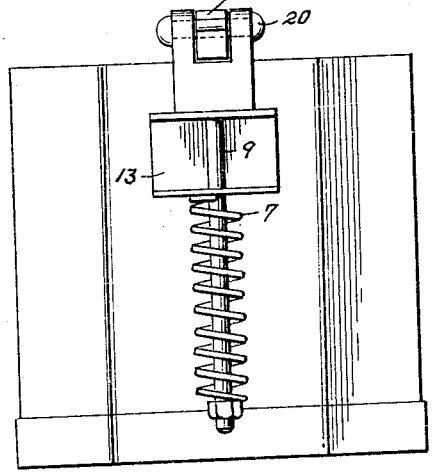
Inventor:
Oscar M. Wolff
J. G. Newton
Attorney Patented Oct. 9, 1928.

1,687,415

UNITED STATES PATENT OFFICE.

OSCAR MEYER WOLFF, OF CHICAGO, ILLINOIS.

MEAT COOKER.

Application filed July 25, 1927. Serial No. 208,358.

This invention relates to meat cookers, in which hams or other meats are cooked after having been compressed into a form suitable for slicing, the bones and inedible portions having been previously removed from the meat, and is an improvement on a meat cooking apparatus shown for example in my previously granted Patent No. 1,456,958, issued May 29, 1923.

In the meat cooker shown in that patent it was found from actual use that the bolts carrying the pawls for holding down the cover became to some extent jammed and would not freely operate for this reason, to distribute the pressure evenly causing the hams to be thicker at one end than at the other and it is the object of the present invention to overcome this tendency. Another object of the invention is to produce a cooker in which the parts operate with the least possible friction and binding between the parts of the cooker and press is obviated.

With these and other objects of the invention, which will appear as the description proceeds, I will now describe the invention in connection with the accompanying drawing, in which Fig. 1 is a sectional view of the cooker and showing in dotted lines the follower of the press.

Fig. 2 is a top view of the cooker and the cover-holding parts, and

Fig. 3 is an end view of the cooker.

After the meat has been boned it is placed in a cooker (1), conveniently shaped as shown in Fig. 2. The cover (2) is then placed on top of the meat and the press follower shown in dotted lines at 3 is pressed down on the cover (2) by a press not shown except the follower (3). As the cover (2) is pressed down with considerable force sufficient to distribute the lean and fat portions of the meat throughout the mass (5), the mass of meat is forced to assume the shape of the cooker, best shown in Fig. 2. After the meat has been sufficiently pressed downwardly into the cooker by the press, it is desirable to hold down the cover (2) under spring influence so as to allow the meat to expand to some extent during the cooking operation. To accomplish this, I provide springs (6, 7) conveniently encircling bolts (8 and 9). These springs are supported at their bottom portions on bolts (10 and 11). At their upper ends they conveniently press against brackets (12 and 13) which are rigidly held to the ends of the cooker, the bolts passing through slots in the brackets and being extended upwardly into the ends of a bar (18), the bolts being bifurcated at their upper ends and the bar held to the bifurcated ends of the bolts by bolts (20, 20$^1$). The bar (18) is slotted as shown best in Fig. 2 and the pawls (22, 23) are pivoted in the slots and extend downwardly to racks (24, 25) rigidly attached to the top of the cover (2). As the follower (3) which is properly slotted to straddle the bar (18) pushes down the cover, the pawls (22, 23) in contact with the teeth of the racks (24, 25) will hold the cover down against the tension of the springs (6 and 7). The springs will allow the slight expansion of meat, but will hold the cover down against the top of the meat with sufficient pressure during the cooking operation of the meat.

It will be understood that the meat is pressed in a press which operates the follower (3), after it has been compressed by the press the press removes the follower (3) and the cooker is removed to the oven and the meat cooked in the oven.

After the cooking operation the pawls (22, 23) are released from the rack and the cover removed.

It will be observed that the pressure against the cover from below will tend to force the bolts (8 and 9) to move vertically, and while the pawls (22, 23) are inclined, they are inclined in transverse directions and neutralize the tendency to push the bar (18) either to the right or left and thus cause a binding effect on the bolts where they pass through the brackets (12, 13) on the ends of the cooker.

For convenience in operation, I provide at one end of the bar (18) as at 20, a pin having a head (27), which may be grasped and the pin removed, thus releasing that end of the bar (18). At the other end of the bar as at 20$^1$, I provide a notch (28) which allows that end of the bar to be slipped under the pivot (20$^1$) by an endwise movement and the bar thus removed or placed in position relatively to the bolt with the greatest facility.

Having now described my invention and its mode of operation, what I claim as new is:

1. A cooker having a cover, a bar extending across the cover leaving the cover exposed on either side of the bar whereby said cover may be pressed down in the cooker after the bar is in place across the cover, said bar having pawls pivoted thereto with their free ends resting on top of the cover, and means to elastically hold the pawls down against the cover.

2. A cooker having a cover with oppositely disposed racks on the top of the cover, a bar extending across the cooker leaving the cover exposed on either side of the bar whereby said cover may be pressed down in the cooker after the bar is in place across the cover, said bar having pawls cooperating with the racks and means at either end of the bar for holding said bar elastically to the cooker.

3. A cooker having a cover, a bar extending across the cover, brackets at either end of the cooker, bolts extending from the bar beyond said brackets, a pin to hold one end of the bar to one bolt and a second pin to hold the other end of the bar to the other bolt, an open notch in the bar permitting its removal from said second pin by an endwise movement of the bar.

4. A cooker having a cover with oppositely disposed racks on the cover, a bar extending over the cooker and having slots therein and pawls pivoted to the bar in said slots to co-act with the racks on the cover, and elastic means to hold the pawls down against the cover racks.

5. A cooker having a cover with brackets at either end of the cooker, bolts extending through the brackets, and spring means abutting the brackets for pressing the bolts downwardly, a bar connecting the upper end of the bolts, and pawls between the bar and cover and co-acting with the cover to hold it down.

In testimony whereof I affix my signature

OSCAR MEYER WOLFF.